(12) United States Patent
Le Leux et al.

(10) Patent No.: US 6,968,678 B2
(45) Date of Patent: Nov. 29, 2005

(54) HIGH EFFICIENCY, REDUCED EMISSIONS INTERNAL COMBUSTION ENGINE SYSTEM, ESPECIALLY SUITABLE FOR GASEOUS FUELS

(76) Inventors: Christopher R. Le Leux, 412 Interlude Rd., New Iberia, LA (US) 70563; Gerald Fischer, 1312 Josephine St. #1, Berkeley, CA (US) 94703

(*) Notice: Subject to any disclaimer, the term of this patent is extended or adjusted under 35 U.S.C. 154(b) by 30 days.

(21) Appl. No.: 10/284,402

(22) Filed: Oct. 31, 2002

(65) Prior Publication Data

US 2004/0083715 A1 May 6, 2004

(51) Int. Cl.$^7$ ................................. F01N 3/00
(52) U.S. Cl. .................... 60/280; 60/274; 60/278; 123/1 A; 123/3
(58) Field of Search .................. 60/280, 274, 285, 60/278; 123/1 A, 3

(56) References Cited

U.S. PATENT DOCUMENTS

| | | | |
|---|---|---|---|
| 4,134,377 A | 1/1979 | Bamsey et al. | |
| 4,135,481 A | 1/1979 | Resler, Jr. | |
| 4,350,129 A * | 9/1982 | Nakajima et al. | 123/310 |
| 4,393,853 A | 7/1983 | Groves | |
| 4,413,593 A | 11/1983 | Resler, Jr. | |
| 4,453,502 A | 6/1984 | Resler, Jr. | |
| 4,609,342 A | 9/1986 | Showalter | |
| 4,682,571 A | 7/1987 | Kaufman et al. | |
| 4,993,386 A * | 2/1991 | Ozasa et al. | 123/25 J |
| 5,031,401 A | 7/1991 | Hinderks | |
| 5,203,311 A | 4/1993 | Hitomi et al. | |
| 5,226,401 A | 7/1993 | Clarke et al. | |
| 5,383,126 A | 1/1995 | Ogawa et al. | |
| 5,483,934 A | 1/1996 | Stutzenberger | |
| 5,640,845 A * | 6/1997 | Ng et al. | 60/274 |
| 5,649,517 A * | 7/1997 | Poola et al. | 123/585 |
| 5,711,154 A | 1/1998 | Baechle et al. | |
| 5,802,846 A | 9/1998 | Bailey | |
| 5,924,280 A | 7/1999 | Tarabulski | |
| 6,098,605 A * | 8/2000 | Brooks | 123/680 |
| 6,138,651 A | 10/2000 | Mori et al. | |
| 6,173,567 B1 * | 1/2001 | Poola et al. | 60/274 |
| 6,213,105 B1 | 4/2001 | Banzhaf et al. | |
| 6,298,835 B1 | 10/2001 | Horie et al. | |
| 6,352,068 B1 | 3/2002 | Jacobsen | |

* cited by examiner

Primary Examiner—Binh Q. Tran
(74) Attorney, Agent, or Firm—C. Dean Domingue; Robert L. Waddell

(57) ABSTRACT

Internal combustion ("IC") engine system for high fuel conversion efficiency and low exhaust emissions, particularly although not exclusively with gaseous fuels. An IC engine operates at approximately stoichiometric ($\lambda=1$) air/fuel mass ratios. A higher-than-normal compression ratio for typical stoichiometric operation is possible for the engine, due to the introduction of an inert (i.e., not chemically reactive in the combustion process) gas into the air/fuel mixture. The inert gas slows the combustion rate to avoid uncontrolled combustion rates and engine "knock." The elevated compression ratio yields higher fuel conversion efficiency. Stoichiometric air/fuel ratio permits catalytic processing of the exhaust gas stream to reduce CO, NOx, and HC emissions via a combination of non-selective catalytic reduction process.

18 Claims, 4 Drawing Sheets

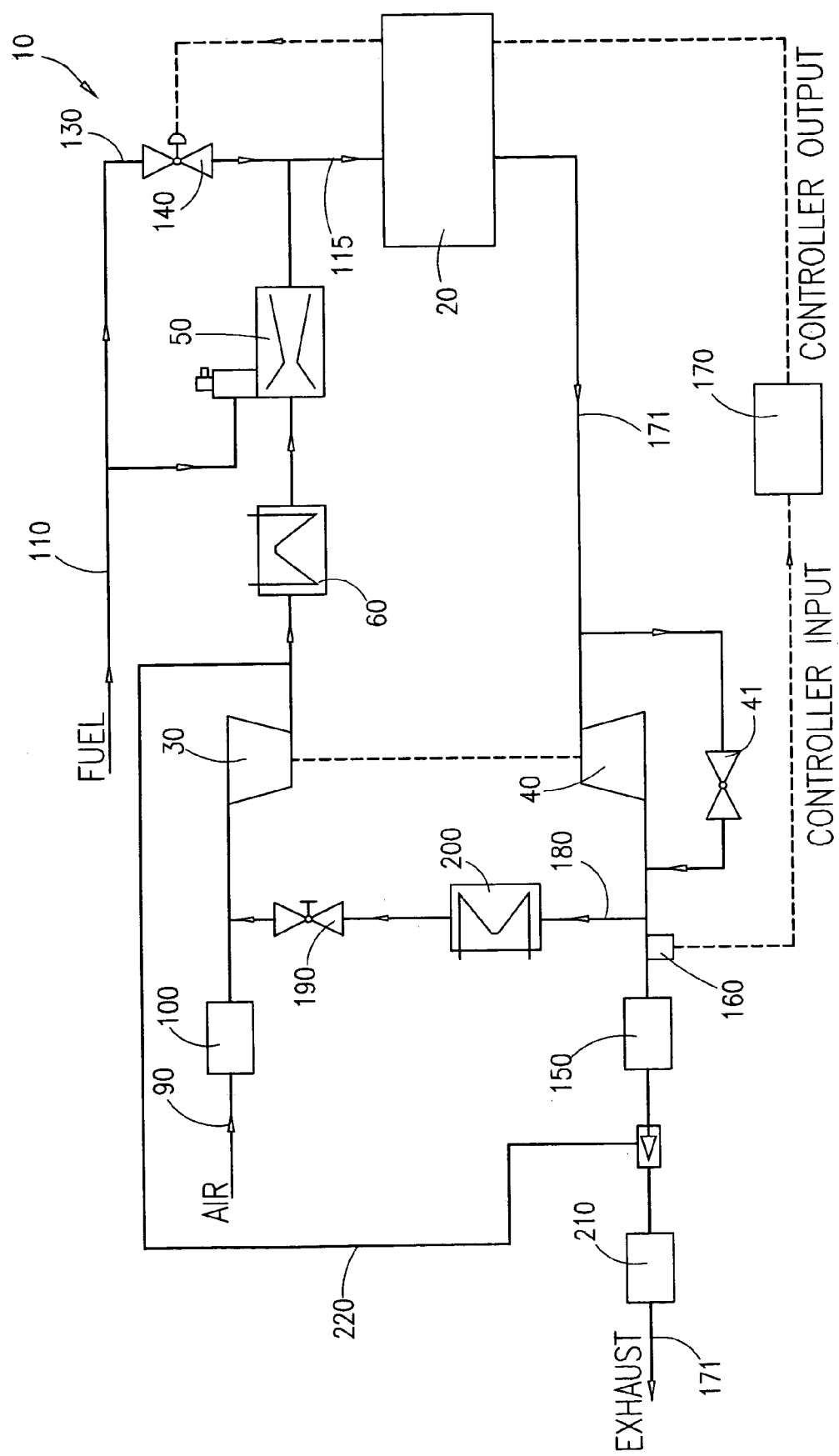

HIGH EFFICIENCY, REDUCED EMISSIONS INTERNAL COMBUSTION ENGINE SYSTEM, ESPECIALLY SUITABLE FOR GASEOUS FUELS

BACKGROUND

1. Field of Art

This invention relates generally to improvements in internal combustion engine systems. More particularly, this invention relates to an internal combustion ("IC") engine, and method of operation thereof, having combustion characteristics which combine certain favorable attributes of both typical stoichiometric combustion and "lean burn" combustion cycles, while at the same time having reduced exhaust emissions.

2. Related Art

The IC engine is used in innumerable applications today. Such engines combine relatively high power with relatively small size, in terms of power output/unit weight of the power source. This high power to weight ratio permits use of IC engines where space is a premium—in transportation sources such as automobiles, for example. Innumerable other installations use IC engines, as the driver for electric power generation, pumps, hydraulic systems and the like.

IC engines use a variety of fuel sources. Liquid fuels such as gasoline and diesel are perhaps the most commonly used fuels in IC engines in transportation, but some automobiles and many stationary IC engine installations use fuel which is in a gaseous form when supplied to the engine. Examples used in automobiles are propane-fueled systems, where the propane is in a liquid phase in the fuel tank, then is dropped to a lower pressure to vaporize it before supplying it to the engine. Stationary IC engines often run off of natural gas, predominantly methane from natural gas wells. Other sources of natural gas include waste material digesters and landfills. Obviously, use of natural gas from such sources is a very efficient and environmentally friendly process.

However, for all their positive attributes, a drawback of IC engines is that all produce by-products of combustion, which are found in the exhaust gas stream emanating from the engine, and which contribute to air pollution. While in a perfect combustion cycle, the by-products would be only carbon dioxide and water, in actual application a perfect combustion cycle cannot be attained. A goal is therefore the reduction of the undesirable by-products of combustion, and as a result reduce their contribution to air pollution. This goal is mandatory to some extent, as governmental entities implement and enforce increasingly strict air pollution controls.

IC Engine Ignition Mechanisms

IC engines can be grouped into (1) spark ignition engines, which rely on an induced spark (generally from a spark plug in the combustion chamber) to initiate the burning of the fuel/air mixture; and (2) compression ignition engines (commonly referred to as diesel engines) which operate at much higher compression ratios, and utilize the corresponding high temperature generated from the higher compression to auto-ignite the fuel/air mixture.

Primary Exhaust Emission Components

The three primary pollutant emission components in a spark ignition engine are CO (carbon monoxide), HC (hydrocarbon, also referred to as volatile organic compounds or VOCs, basically unburned hydrocarbon fuel), and NOx (nitrogen oxides of different formulae, which are a chief contributor to smog formation). In addition to those emissions, a compression ignition engine (e.g., a diesel engine) also emits PM (particulate matter, the black smoke typical of a diesel). The two ignition mechanisms typically exhibit some differences in emissions in real-life applications. For example, both CO and NOx emissions are lower with CI engines.

Stoichiometric v. Lean Burn Combustion Cycles

The mass ratio of air to fuel is an important consideration not only for operating efficiency but also emissions reasons. Stoichiometric engines, or more properly stoichiometric combustion processes, use approximately the chemically correct or "exact" amount of air/fuel ratio for combustion. Prior art engines operating under stoichiometric combustion cycles must utilize a relatively low compression ratio to prevent uncontrolled combustion or burn rate or "knock." Relatively low compression ratios translate into relatively low fuel conversion efficiency. Typical compression ratios (defined as maximum cylinder volume/minimum cylinder volume) for SI engines in general are between 8 and 12, although depending upon many variables, compression ratios higher than this range may be possible (e.g., to around 16).

Another combustion cycle is the "lean burn" cycle, which has an excess of air in the air/fuel mixture, i.e. more air than is necessary for combustion. In comparison to a stoichiometric cycle, engines operating with a lean burn cycle typically employ a higher compression ratio, and the higher compression ratio combined with the fuel-lean air/fuel ratio is capable of yielding increased fuel conversion efficiency (translated into useful work per unit fuel used, such as miles per gallon). The higher compression ratios of lean burn cycles are possible in part because the combustion process is slower, with the excess air acting as an energy or heat sink to absorb some of the heat of combustion. Additional benefits of a lean burn cycle are usually reduced CO emissions, because there is plenty of oxygen to combine with CO to form $CO_2$; and reduced HC emissions because the excess air (oxygen) tends to yield more complete combustion. Those are emission-related "pluses" from a lean burn cycle.

NOx emissions can decrease at very high air/fuel ratios, but in practice lean burn engines used for automotive applications operate at ratios not far above stoichiometric ratios, so this effect is not really seen. However, certain stationary power applications use very high air/fuel mass ratios, as high as $\lambda=2$, and at such high ratios NOx emissions are low. A tradeoff occurs at these high ratios, as HC emissions tend to increase due to an increased quench effect and possibility of misfiring.

The higher compression ratio in a lean burn engine usually generates higher combustion temperatures. These higher combustion temperatures tend to result in higher NOx production. In addition, another disadvantage of the lean burn cycle is the difficulty in treatment of NOx emissions, due to the presence of excess oxygen in the exhaust gas stream (the high affinity of the O2 makes it difficult to convert NOx into N2 and CO2). Typical non-selective catalytic reduction ("NSCR") systems, common in automotive engine applications, are of little utility. So while the lean burn technology is generally more efficient, and may generate lesser CO and HC emissions, NOx emissions tend to be higher (all of this being in relation to a stoichiometric combustion cycle).

Catalytic Processing of Exhaust

In many engines (whether stoichiometric or lean burn), a "three-way" catalytic converter is used to lower CO, HC and NOx emissions by passing the exhaust gases through the converter. Catalytic converters used with SI engines comprise a bed of active catalytic material (usually in a metal casing) through which exhaust gases are flowed. Various bed arrangements are well known in the art (beads, porous elements, etc.). The catalysts themselves are of different types to effect different emission controls. Some catalytic converters are of a two-bed design. One bed contains oxidation catalysts oxidize CO and HC to CO2 and water, and typically comprise various noble metals (such as mixtures of platinum and palladium) well known in the art. Another bed contains other catalytic agents usually used for NOx reduction (well known in the art, such as base metal catalysts), which is preferably operating in a low-oxygen environment. IC engine operation at or near stoichiometric permits use of a single-bed, "three way" catalytic converter (also called a non-selective catalytic reduction or NSCR system), which both oxidizes CO and HC and reduces NOx. Three way catalysts are well known in the art, and are common in automotive applications. Operation of such three-way catalysts is enhanced with oxygen sensing in the engine exhaust to sense whether the engine is operating fuel rich or lean, and to adjust the air/fuel mixture to the engine accordingly to maintain nearstoichiometric operation.

As a result, while not as efficient as lean burn engines, stoichiometric burn engines have the advantage that an NSCR system can be used for high conversion rates of NOx, CO, and HC. In order to keep exhaust emissions low, the engine has to keep air/fuel ratio fairly constant around stoichiometric (the air/fuel ratio is commonly known as lambda, "$\lambda$," and a stoichiometric ratio has $\lambda=1$; the "lambda window" refers to the range of lambda values slightly above and below 1). To achieve $\lambda \cong 1$, a closed loop air fuel ratio control system is used, incorporating an oxygen sensor placed in the exhaust gas stream to sense the presence of excess oxygen, and in response to a signal from the oxygen sensor a controller increases/decreases fuel delivery. The smaller the lambda window the better and more efficient the catalytic process. This process is a well proven technology for automotive systems using liquid fuels, in particular gasoline.

However, the use of gaseous fuels such as natural gas, digester gas, or landfill gas presents problems with this type of emission control system. Exhaust gas resulting from a combustion process burning gaseous fuel contains a higher concentration of hydrogen and light hydrocarbons compared to liquid fuels such as gasoline. These components lead to interference with "automotive type" oxygen sensors. The result is a low efficiency in pollutant conversion in the aftertreatment system.

A desirable goal is to have an IC engine system with the desirable characteristics of both stoichiometric and lean burn combustion cycles—relatively high efficiency, relatively low amounts of undesirable exhaust emissions, and efficient catalytic processing of such exhaust emissions as are generated. In addition, the IC engine system must be adapted to the use of gaseous hydrocarbon fuels.

SUMMARY OF THE INVENTION

This invention comprises an IC engine system which operates at a relatively high compression ratio for increased fuel conversion or operational efficiency, yet which is adapted to operate at near stoichiometric air/fuel ratios ($\lambda$ approximately=1) without engine knock. The stoichiometric operating conditions permit use of an NSCR exhaust gas treatment system to lower emissions. In order to prevent uncontrolled combustion rates and resulting engine knock in the high compression ratio environment, the combustion process is slowed by introducing an inert gas (by way of example only, nitrogen or carbon dioxide) into the air/fuel stream supplied to the engine. Another possible inert gas is exhaust gas, if little oxygen and/or unburned fuel is present in the exhaust gas. The inert gas does not react in the combustion process, but simply slows the process down. Stoichiometric operating conditions are maintained by a controller sensing oxygen concentration in the exhaust stream, and adjusting the air/fuel ratio accordingly. The IC engine system of the present invention is particularly, although not exclusively, applicable to the use of gaseous fuels.

BRIEF DESCRIPTION OF THE DRAWINGS

FIGS. 5 and 6 are additional embodiments of the invention, comprising a two bed catalytic converter combined with air injection into the exhaust gas stream.

DESCRIPTION OF THE PRESENTLY PREFERRED EMBODIMENT

While the present invention may take various embodiments, with reference to the drawings some of the presently preferred embodiments are now described. It is understood that those skilled in the relevant art field will recognize that the scope of the invention encompasses not only the embodiments set out, but alternate embodiments as well.

Figure 1:
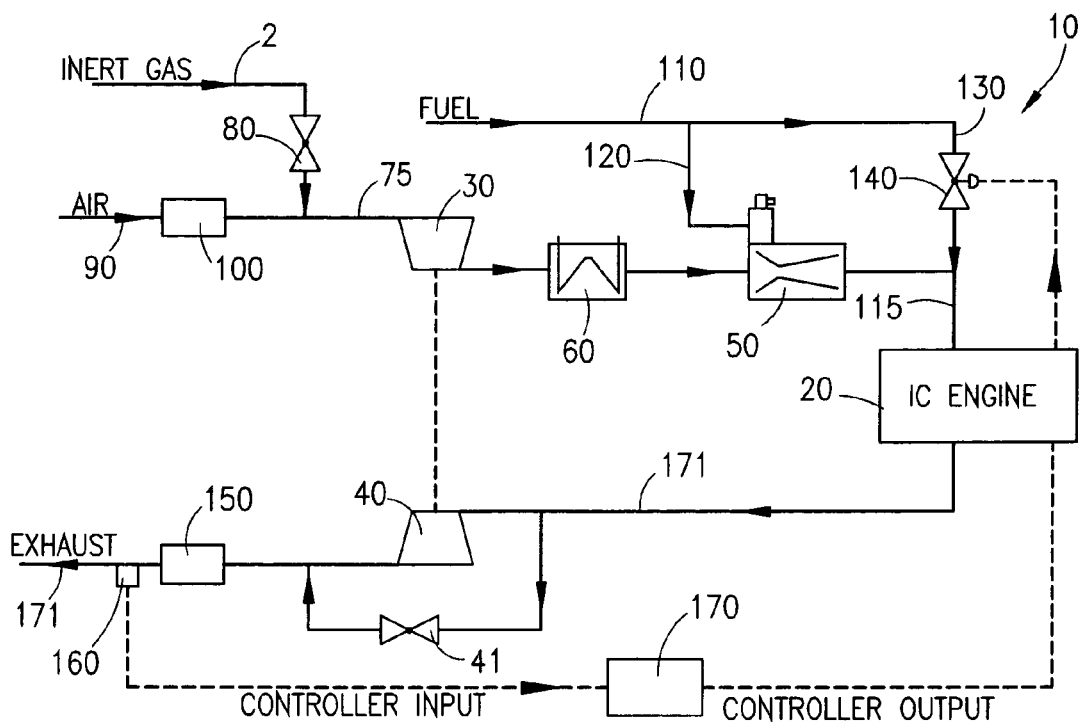
FIG. 1 is a diagram of the principal components of one embodiment of the present invention.

With reference to the drawings, especially FIG. 1, one presently preferred embodiment of the IC engine system 10 comprises an IC (internal combustion) engine 20, which receives an air/inert gas/fuel mixture through composite influent line 115. Engine 20 may be of a configuration and size appropriate for the desired application. For example, engines of widely varying numbers of cylinders, power output, and cylinder arrangement can be used. Engine 20 is capable of operating at compression ratios higher than typical stoichiometric combustion cycles. By way of example only, compression ratios of 12 or more permit increased fuel conversion or operational efficiency, while not generating excessive uncontrolled combustion or engine knock, when operated consistent with the present invention.

While this embodiment is described with respect to a gaseous fuel, it is understood that other embodiments could also use liquid or gasified liquid fuels. Fuel influent line 110, connected to a fuel source, preferably divides into a main fuel line 120 and an adjustment or "trim" fuel line 130. As will be later described, trim fuel flow through trim fuel line 130 is controlled by an output from controller 170, which in turn receives signals from oxygen sensor 160 sensing oxygen level in the exhaust gas stream flowing through exhaust gas effluent line 171. Adjustment of the trim fuel gas stream flow rate affects air/fuel ratio and assists in controlling air/fuel mass ratio to approximately stoichiometric, and thereby controlling the various emission levels in exhaust gas stream, as is later described.

Air influent line 90 is preferably flow-coupled to filter 100, in order to filter the air influent stream. An inert gas influent line 70 (flow therethrough controlled by inert gas control valve 80) is coupled to air influent line 90, and provides inert gas to mix with the influent air stream, ultimately resulting in a combined air/inert gas stream flowing through air/inert gas influent line 75. Inert gas influent line 70 is connected to an inert gas source. Inert gases suitable for use in the present invention comprise nitrogen and CO2, although other inert gases known in the art can be used, as long as they do not react in the combustion process. Yet another possible inert gas is water vapor. As later described, exhaust gas may also be used. The ratio or amount of inert gas to be injected along with the air is that amount sufficient to avoid engine knock, which may be determined by means known in the art. While the air and inert gas streams may be separately compressed, in the preferred embodiment the air/inert gas stream flows through air/inert gas influent line 75 to feed compressor 30. Since the process of compression typically raises the temperature of the combined stream, preferably the stream flows through an intercooler 60 to lower the temperature.

Compressor 30, in the preferred embodiment, is operatively coupled to and powered by turbine 40. In the preferred embodiment, compressor 30 is of a centrifugal design, although other operating mechanisms could be used. It is understood that compressor 30 could be powered by a mover other than a turbine, for example a super charger (which is driven mechanically by engine 20, rather than by the exhaust gas stream). A waste gate 41 permits at least partial bypass of turbine 40 and can be used to control exhaust gas flow through turbine 40.

It is understood that the scope of the present invention further comprises a non-charged, or naturally aspirated engine. Said another way, while the preferred embodiment of the present invention comprises some form of boosting the charge pressure of the inlet air stream, the scope of the present invention comprises both charged and non-charged engines.

The air/inert gas stream flowing through air/inert gas influent line 75 is mixed with the main fuel stream, flowing through main fuel line 120, by a means for mixing the air/inert gas and fuel streams, 50. In the presently preferred embodiment, the means for mixing the air/inert gas and fuel streams 50 is a carburetor; however, it is understood that different types of means for mixing gaseous streams, for example fuel injection systems, could also be used. The air/inert gas and fuel streams may be mixed, with the system of the present invention, to achieve a mixture near stoichiometric ($\lambda=1$), with monitoring means well known in the art. Preferably, $\lambda$ is held to a window of values between 0.990 and 1.010.

An exhaust gas line 171 exits engine 20 and carries the exhaust gas stream away, and in the preferred embodiment exhaust gas line 171 is fluidly coupled to turbine 40. The exhaust gas flowing therethrough powers turbine 40, which in turn drives compressor 30. Exhaust gas line 171 is fluidly coupled to a catalytic system 150, for flow of the exhaust gas stream through the catalyst bed therein and oxidation/reduction of various components of the exhaust gas stream, as is later described. In one presently preferred embodiment, catalytic system 150 is a non-selective catalytic reduction or three-way system well known in the art, which provides both oxidation of CO and HC and reduction NOx.

An oxygen sensor 160 preferably downstream of catalytic system 150 senses the oxygen level in the exhaust gas stream and sends a signal to controller 170. However, if desired, the oxygen sensor can be placed in the exhaust gas stream upstream of the catalytic system. In response to that signal, controller 170 emits a signal to a means for controlling air/fuel mass ratio, which in the preferred embodiment may be a trim fuel valve 140. The controller may be of a type well known in the relevant art field. Trim fuel flow is thus controllable to maintain an air/fuel mass ratio near stoichiometric, and thus enable the catalytic system to best minimize harmful emissions. It is understood that alternative apparatus to vary and finely control air/fuel ratio, other than a trim fuel supply, are possible. Alternatives embodied within the scope of the present invention include fuel regulators well known in the art.

The present invention is especially suitable for use with gaseous fuels, which can interfere with conventional or automotive type oxygen sensors. Consistent with the invention, a preferred oxygen sensor known as a wideband oxygen sensor is preferably used. A typical automotive type binary oxygen sensor, known in the art, utilizes a so-called "Nernst" cell, which is an oxygen concentration cell with a solid electrolyte through which current is carried by oxygen ions. In addition to the Nernst cell, the wideband sensor of the preferred oxygen sensor uses a membrane pump, and the pumping current provides information regarding the air/fuel ratio. Wide band air/fuel mass ratio sensors may comprise control logic sensors which may be programmed to accommodate a hydrogen or methane compensation curve. These types of oxygen sensors are much more accurate and show less interference from other exhaust gas species.

Operation of the System

Operation of the IC engine system 10 comprises providing adequate sources of air, inert gas, and fuel to the respective influent flow lines. Examples of gaseous fuels suitable for use in the present invention include predominantly methane sources such as natural gas, biogenic digester gas, and landfill gas. Other gaseous fuels contemplated by the invention include fuels such as propane and the like. Still other fuels suitable for use with the present invention and encompassed within the scope thereof are hydrogen, wood gasification, and other fuels with a high CO content. The scope of the invention further comprises the use of liquid fuels such as gasoline, which are placed in gaseous form via carburetion, injection or other means known in the art.

Engine 20 operates with an elevated compression ratio, in order to yield increased operational efficiency. While actual compression ratios possible vary, compression ratios possible are in the upper end of typical SI engine ratios, by way of example only, 10 to 16, and preferably greater than 12. It is understood that higher or lower compression ratios may be possible and/or desirable, depending upon actual operating conditions. The mass ratio of air/fuel is monitored and adjusted so as to maintain a ratio of near stoichiometric ($\lambda=1$). Inert gas flow is adjusted so as to minimize or preferably preclude uncontrolled combustion in engine 20, typically evidenced by engine knock.

System startup is by means well known to those in the relevant art. Oxygen content in the exhaust stream is continuously monitored by oxygen sensor 160. Once engine 20 has been started and a steady operating state attained, if excessively high or low oxygen levels are sensed, controller 170 is programmed to adjust trim fuel control valve 140 and increase/decrease trim fuel flow rate to regain near-stoichiometric conditions. As mentioned above, a presently preferred mode of operation of the invention is to monitor and adjust $\lambda$ to maintain a value between 0.990 and 1.010. This range of values will permit favorable emission regulation. As is known in the art, other controls permit adjustment of the other various components of the system, including but not limited to inert gas control valve 80, trim fuel control valve 140, intercooler 60, turbine waste gate 41, and the like to optimize operating conditions.

Inert gas ratios suitable for operation of the present invention vary depending upon the compression ratio and fuel quality. Suitable ratios are between about 5% and 25% on a mass basis.

Figure 2:
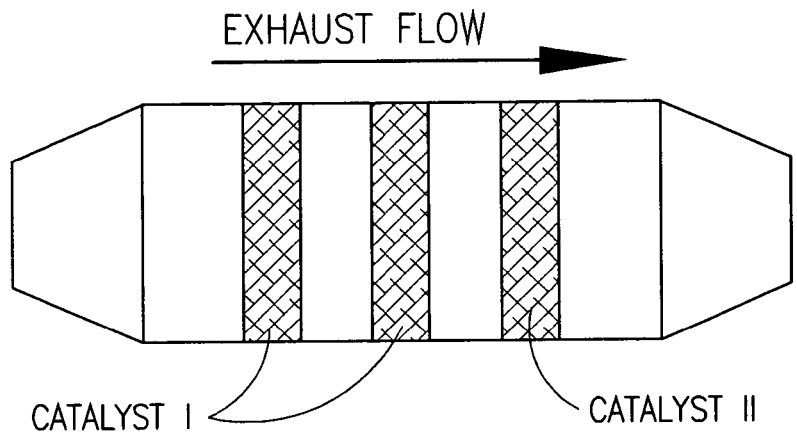
FIG. 2 shows an exemplary catalytic converter for use in certain embodiments of the present invention.

Catalytic system 150 preferably comprises multiple catalyst types, to oxidize/reduce different components of the exhaust stream. FIG. 2 shows an exemplary catalytic system. A first catalyst, Catalyst I, is preferably a typical three-way catalyst bed, emphasizing NOx reduction, with catalysts as previously described. Catalyst II has a catalyst bed emphasizing oxidation of CO and HC, with catalysts as previously described, which is of particular benefit with high-methane content fuels, such as natural gas, digester gas, and landfill gas.

Figure 3:
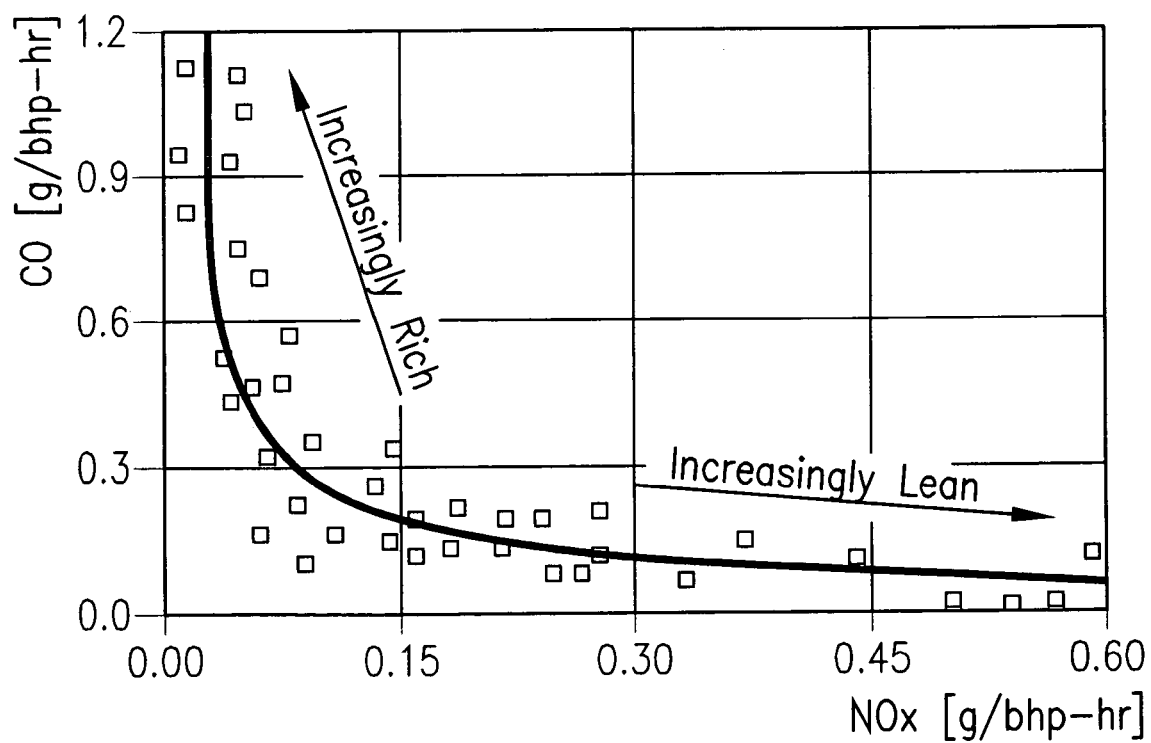
FIG. 3 illustrates the trends in CO and NOx emissions as a function of air/fuel mass ratio ($\lambda$).

Optimum operation of the IC engine system 10 achieves low levels of CO, HC, and NOx in the exhaust stream. FIG. 3 is an illustrative plot of CO and NOx (both expressed in grams/brake horsepower—hour). As illustrated, increasingly rich (that is, fuel rich, or air/fuel ratios less than stoichiometric, with $\lambda$ less than 1) results in increased CO and decreased NOx; increasingly lean (fuel lean, or air/fuel ratios greater than stoichiometric, with $\lambda$ greater than 1) results in decreased CO and increased NOx. Obviously, optimum operating conditions minimize both CO and NOx.

Additional Embodiments

Figure 4:
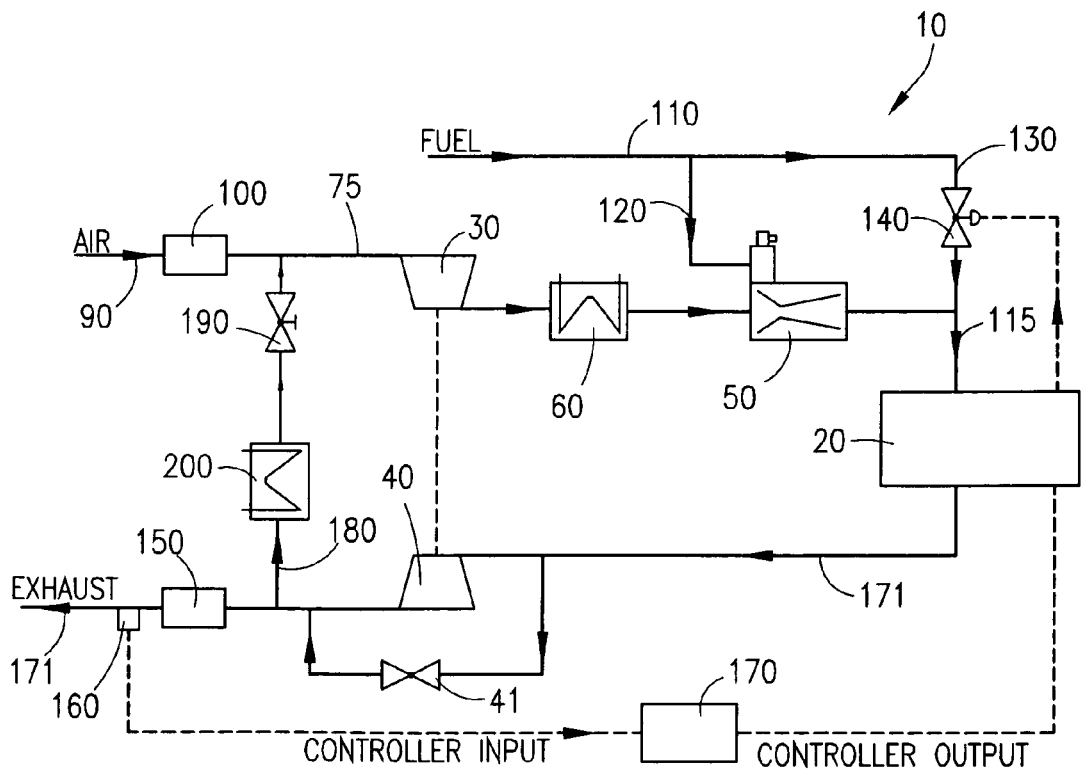
FIG. 4 is a diagram of another embodiment.

The present invention lends itself readily to additional embodiments. FIG. 4 shows another embodiment in which exhaust gas is used as the inert gas for dampening of combustion speed, thus allowing higher compression ratios. Exhaust gas mixing line 180 routes a portion of the exhaust gas effluent stream into air influent line 90, with flow through exhaust gas mixing line 180 controlled by flow control valve 190. In the preferred embodiment, the exhaust gas mixing line flows through an intercooler 200 to reduce temperature thereof. For efficient use of exhaust gas as the inert gas, the exhaust gas should be relatively low in HC and oxygen. Monitoring means known in the art permit the user to monitor the applicable levels. Operation of the system is consistent with the previously described embodiment.

Figure 5:
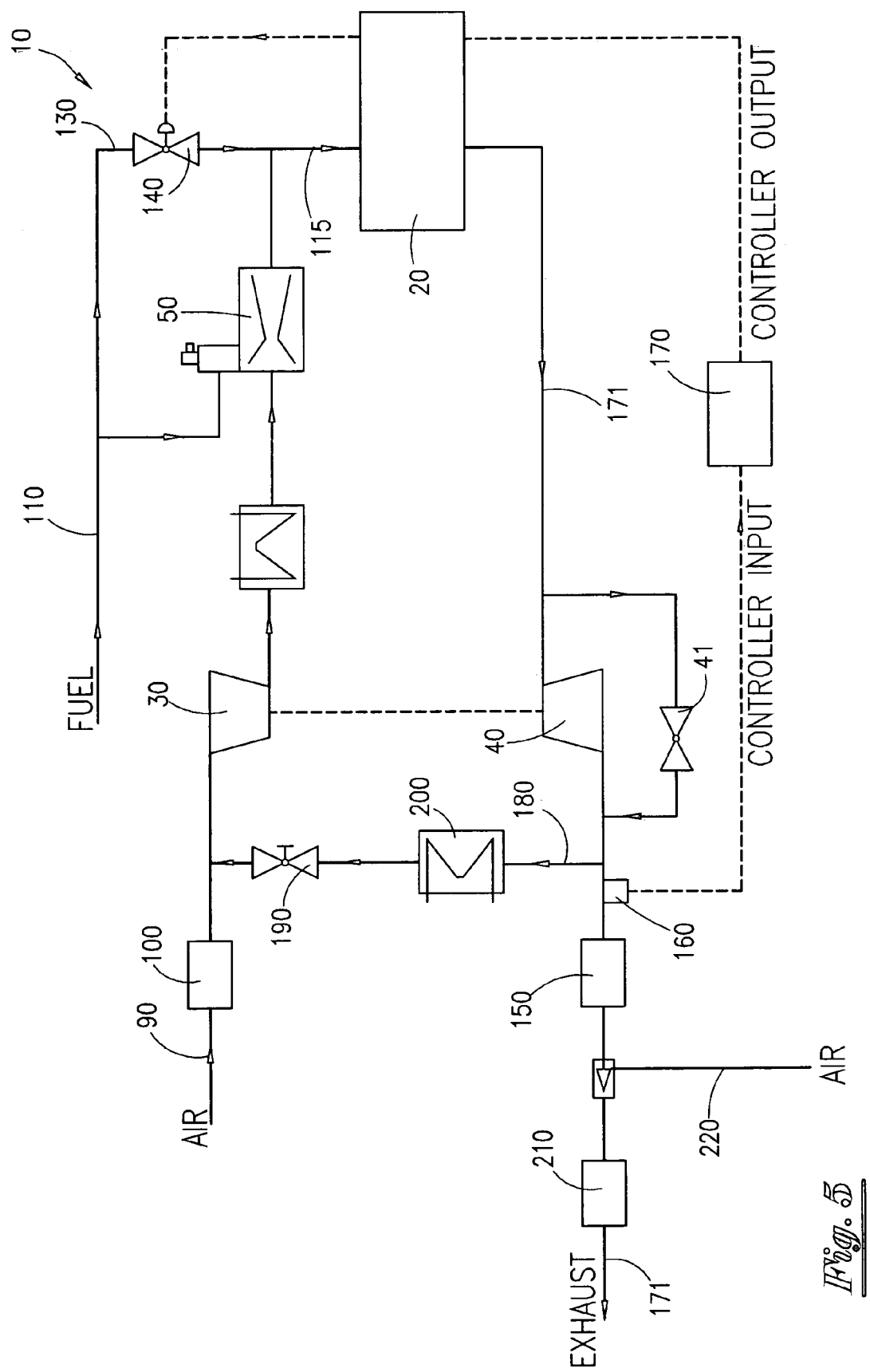

FIG. 5 is another embodiment of the present invention. This embodiment comprises a two-bed catalytic system, with exhaust gas as the inert gas, and air injection after the NOx reduction catalysis to increase CO and HC oxidation. In this embodiment, a second catalytic system 210 is typically added. First catalytic system 150 contains catalysts well known in the art and previously described herein, and preferably reduces NOx compounds. Second catalytic system 210 preferably oxidizes CO and HC. An excess of oxygen is a hindrance to NOx reduction, while excess oxygen enhances CO and HC oxidation. Therefore, with the two-bed system, addition oxygen (air) can advantageously be introduced downstream of the first catalytic system. Accordingly, an air injection line 220 injects air into the exhaust gas stream downstream of catalytic system 150. A pressurized air source feeds air injection line 220, in order to inject air into the exhaust gas stream. As with earlier embodiments, oxygen sensor 160 provides input to controller 170, which as previously described adjusts air/fuel ratio to maintain a ratio near stoichiometric. Operation of the system is consistent with the previously described embodiment.

FIG. 6 is yet another embodiment of the present invention, also utilizing exhaust gas as the inert gas and utilizing injected air in the exhaust gas effluent stream to adjust emission levels. In this embodiment, as in the embodiment shown in FIG. 5, a second catalytic system 210 is typically added, with functioning as previously described. Here, an air injection line 220 routes compressed air/inert gas from downstream of compressor 30, thus having the higher pressure needed to overcome exhaust line pressure.

In the embodiments of FIGS. 5 and 6, the oxygen sensor may be either upstream or downstream of catalytic system 150, but in either case must be upstream of the air injection point.

Another mode of operation of the present invention is contemplated with the embodiments of FIGS. 5 and 6. The system is operated in a slightly fuel rich mode ($\lambda$=0.990 to 0.999). This tends to reduce NOx emissions, while not measurably decreasing fuel conversion efficiency. Normally, in a fuel rich environment, CO and HC oxidation would be hampered, but with the embodiments of FIGS. 5 and 6, which comprise air injection after NOx reduction but before the second catalytic system, the additional air enables CO and HC oxidation in the second catalytic system. The result is a very low final emission levels of CO, HC, and NOx.

The preceding description of the various presently preferred embodiments contains many specificities, but these are offered as illustrative only and not in a limiting sense. Many different embodiments and changes to the embodiments could be implemented, as will be recognized by those skilled in the relevant art. For example, different gaseous and non-gaseous fuels can be employed for the operating system. Various catalyzing agents known in the art can be used for NOx reduction and CO and HC oxidation. While some means for elevated supply pressure for the air/inert gas/fuel mixture is contemplated, it is understood that same may be a turbocharger, supercharger, or even non-turbine or centrifugal means. Mixing of the air/fuel or air/inert gas/fuel streams may be via carburetion, fuel injection, or other valving means known in the art.

Therefore, the scope of the invention is not to be limited by the preceding description, but only by the appended claims and their legal equivalents.

We claim:

1. An internal combustion engine system, comprising:
   a) an internal combustion engine having a compression ratio of at least 11:1;
   b) an exhaust line operatively attached to said engine and fluidly moving exhaust gases from said engine;
   c) an air influent line and a fuel influent line fluidly coupled by a means for mixing air and fuel flowing through said air and fuel influent lines, and an inert gas influent line, said air, fuel, and inert gas influent lines connected to sources of air, fuel and inert gas, respectively, and feeding a composite influent line operatively attached to said engine and fluidly moving an air/inert gas/fuel mixture into said engine, for combustion therein;
   d) an oxygen sensor disposed in said exhaust line and sensing oxygen in said exhaust gases;
   e) a controller receiving a signal from said oxygen sensor, said controller coupled to a means for adjusting an air/fuel mixture ratio being supplied to said engine, to maintain said air/fuel mixture ratio near a stoichiometric value; and
   f) a first catalytic processing system fluidly coupled to said exhaust gas line, so that said exhaust gases flow therethrough, said first catalytic processing system comprising catalysts for lowering NOx compounds, carbon monoxide, and hydrocarbons;

g) a turbine fluidly connected to said exhaust gas line and driven by said exhaust gases;

h) a compressor operatively coupled to and driven by said turbine, said air and inert gas influent lines routed through said compressor and the respective flowstreams compressed therein;

i) a second catalytic processing system fluidly coupled to said exhaust line downstream of said first catalytic processing system; and j) an injection line fluidly coupled to said exhaust line intermediate said first and second catalytic processing systems.

2. The system of claim 1, further comprising:
a valve disposed in said inert gas influent line, for control of inert gas flow;
a waste gate routing a part of exhaust gas flow around turbocharger;
an intercooler disposed in said air influent line downstream of said compressor.

3. The system of claim 2, wherein said means for adjusting said air/fuel mixture ratio is a trim fuel line having a control valve therein, controlled by said controller.

4. The system of claim 3, wherein said oxygen sensor is a broadband sensor.

5. The system of claim 2, wherein said oxygen sensor is a broadband sensor.

6. The system of claim 2, wherein said fuel is gaseous fuel.

7. The system of claim 6, wherein said inert gas is nitrogen.

8. The system of claim 7, wherein said inert gas is carbon dioxide.

9. The system of claim 1, wherein said oxygen sensor is a broadband sensor.

10. The system of claim 1, wherein said oxygen sensor is a broadband sensor.

11. The system of claim 1, wherein said inert gas is nitrogen.

12. The system of claim 1, wherein said inert gas is carbon dioxide.

13. The system of claim 1, wherein said fuel is gaseous fuel.

14. An internal combustion engine system, comprising:
a) an internal combustion engine having a compression ratio of at least 8;
b) an exhaust line operatively attached to said engine and fluidly moving exhaust gases from said engine;
c) an air influent line and a fuel influent line fluidly coupled by a means for mixing air and fuel flowing through said air and fuel influent lines, said air and fuel influent lines connected to sources of air and fuel, respectively;
d) an exhaust gas mixing line carrying a portion of said exhaust gases from said exhaust line to said air influent line, to mix with air therein, said air, exhaust gas mixing, and fuel influent lines feeding a composite influent line operatively attached to said engine and fluidly moving an air/exhaust gas/fuel mixture into said engine, for combustion therein;

e) an oxygen sensor disposed in said exhaust line and sensing oxygen in said exhaust gases;

f) a controller receiving a signal from said oxygen sensor, said controller coupled to a means for adjusting an air/fuel mixture ratio being supplied to said engine, to maintain said air/fuel mixture ratio near a stoichiometric value; and g) a first catalytic processing system fluidly coupled to said exhaust gas line, so that said exhaust gases flow therethrough, said catalytic processing system comprising catalysts for lowering NOx compounds, carbon monoxide, hydrocarbons;

h) a turbine fluidly connected to said exhaust gas line and driven by said exhaust gases;

i) a compressor operatively coupled to and driven by said turbine, said air and exhaust mixing gas influent lines routed through said compressor and the respective flowstreams compressed therein;

j) a flow control valve in said exhaust gas mixing line;

k) a waste gate routing a part of exhaust gas flow around turbocharger;

l) an intercooler disposed in said air influent line downstream of said compressor;

and wherein: said means for adjusting said air/fuel ratio is a trim fuel line having a control valve therein, controlled by said controller;

m) a second catalytic processing system fluidly coupled to said exhaust line downstream of said first catalytic processing system;

n) and an air injection line fluidly coupled to said exhaust line intermediate said first and second catalytic processing systems.

15. The system of claim 14, wherein said first catalytic processing system comprises catalysts for NOx reduction, and said second catalytic system comprises catalysts for carbon monoxide and hydrocarbon oxidation.

16. The system of claim 15, wherein said oxygen sensor is disposed in said exhaust line upstream of said first catalytic processing system.

17. The system of claim 15, wherein said oxygen sensor is disposed in said exhaust line downstream of said first catalytic processing system and upstream of said air injection line.

18. The system of claim 14, wherein said air injection line routes a portion of the output from said compressor into said exhaust line.

* * * * *